United States Patent [19]

Ohtake et al.

[11] Patent Number: 5,716,674

[45] Date of Patent: Feb. 10, 1998

[54] INFORMATION RECORDING MEDIUM AND METHODS OF MANUFACTURING AND USING THE SAME

[75] Inventors: Tadashi Ohtake, Neyagawa; Norihisa Mino, Settsu; Kazufumi Ogawa, Nara, all of Japan

[73] Assignee: Matsushita Electric Industrial Co., Ltd., Osaka, Japan

[21] Appl. No.: 718,129

[22] Filed: Sep. 18, 1996

Related U.S. Application Data

[62] Division of Ser. No. 453,506, May 30, 1995, Pat. No. 5,591,487, which is a division of Ser. No. 107,308, Aug. 17, 1993, Pat. No. 5,447,778.

[30] Foreign Application Priority Data

Aug. 25, 1992 [JP] Japan ................................. 4-226204

[51] Int. Cl.$^6$ .............................. B05D 1/18; B05D 3/00
[52] U.S. Cl. ...................... 427/299; 346/135.1; 369/126; 427/353; 427/430.1; 430/19; 430/270.15; 430/270.16; 430/945
[58] Field of Search ....................... 346/135.1; 369/126; 430/19, 270.15, 270.16, 945; 427/299, 353, 430.1

[56] References Cited

U.S. PATENT DOCUMENTS

| | | | |
|---|---|---|---|
| 3,632,298 | 1/1972 | Franklin | 8/120 |
| 3,962,198 | 6/1976 | Wada et al. | 260/889 |
| 4,012,458 | 3/1977 | Wada et al. | 260/837 R |
| 5,161,147 | 11/1992 | Goldberg et al. | 369/126 X |
| 5,324,548 | 6/1994 | Ogawa et al. | 427/430.1 X |
| 5,439,777 | 8/1995 | Kawada et al. | 430/19 X |

FOREIGN PATENT DOCUMENTS 0 248 907  12/1987  European Pat. Off. .

OTHER PUBLICATIONS

Database WPI, Section Ch, Week 8242, 11 Sep. 1982—Abstract of JP-A-57 147 630.

K.L. Mittal, "Polymers in Information Storage Technology," *Inst. of Adv. Mat. Study*, (1988), pp. 105–116.

K. Ogawa et al., "Reactions of Chemically Adsorbed Monolayers Induced by Electron Beam Irradiation in Active Gas Atmosphere and Applications ...", *Langmuir*, vol. 6, No. 4, Apr. 1990, pp. 851–856.

Database WPI, Sectioin Ch, Week 8638, 12 Aug. 1986—Abstract of JP-A-61 179 792.

*Primary Examiner*—Michael Lusignan
*Attorney, Agent, or Firm*—Morrison & Foerster LLP

[57] ABSTRACT

An information recording layer on a substrate provides a method of recording information by selectively opening the rings of dicyclopentadiene skeletons, thus recording information by forming cyclopentadiene skeletons. The information recorded by the method can be erased by the cycloaddition of cyclopentadiene skeletons. Information can also be recorded or erased by incorporating or eliminating a metal ion from a selectively opened section of a ring of a dicyclopentadiene skeleton after forming an organic thin film comprising the dicyclopentadiene skeleton. Alternatively, after the formation of an organic thin film comprising a cyclopentadiene skeleton, a heterocycle or a benzene ring, a metal ion is incorporated or eliminated from a section between at least two rings of the cyclopentadiene skeleton, the heterocycle or the benzene ring. Thereafter, a metallocene skeleton or a skeleton analogous to the metallocene skeleton is formed or eliminated, thus recording or erasing information. The selective opening of a section of a dicyclopentadiene skeleton ring is carried out by heat or light. The readout of the information is performed by recognizing the cyclopentadiene skeleton, the metallocene skeleton, the skeleton analogous to the metallocene skeleton or the metal atom. The information recording layer of the invention is a chemically adsorbed monomolecular film with a thickness at the angstrom level.

14 Claims, 8 Drawing Sheets

INFORMATION RECORDING MEDIUM AND METHODS OF MANUFACTURING AND USING THE SAME

This application is a division of U.S. application Ser. No. 08/453,506 filed May 30, 1995; now U.S. Pat. No. 5,591,487, which is is a division of U.S. application Ser. No. 107,308, filed Aug. 17, 1993, now U.S. Pat. No. 5,447,778.

FIELD OF THE INVENTION

The invention relates to an information recording medium and a method of manufacturing the same, and to methods of reading and erasing recorded information on the information recording medium.

BACKGROUND OF THE INVENTION

Conventional information recording media include thin inorganic magnetic materials used for magnetic recording or photoelectromagnetic recording, organic photoisomerization materials used for optical storage, and the like.

Furthermore, Langmuir-Blodgett (LB) films, which have thicknesses at the angstrom level or can have their thicknesses controlled at that level, are well known. A thin recording medium having an optical recording property can be manufactured by using an organic material with a photoisomerization property as the molecules of the LB film. For example, a method of using spiropyrane derivatives (E. Ando, J. Hibino, T. Hashida and K. Morimoto, Thin Solid Films, 160, 279 (1988)), and a method of applying azobenzene derivatives (H. S. Blairand and C. B. McArdle, Polymer, 25, 1347 (1984)), are known in the art.

However, the use of conventional magnetic recording media using inorganic magnetic materials has been limited since the thickness of the media cannot be thinner than a few hundred angstroms. The conventional optical recording media applying photoisomerization organic materials, on the other hand, can be made thin due to the use of LB films. However, these optical recording media, which do not have sufficient endurance against processing, cannot be put to practical use.

SUMMARY OF THE INVENTION

Objectives of the invention are to provide an information recording medium which has a thickness of a few or dozens of angstroms or can have its thickness controlled at that angstrom level, with excellent stability and endurance against processing; a method of manufacturing the same; and methods of recording, reading and erasing information on the medium.

In order to accomplish the above objectives, the first information recording medium of the invention comprises an information recording layer comprising a dicyclopentadiene skeleton on a substrate; the ring of the dicyclopentadiene skeleton is selectively opened by heat or light, thus recording information by forming cyclopentadiene skeletons.

The second information recording medium of the invention also comprises an information recording layer comprising a dicyclopentadiene skeleton on a substrate; a metal ion is incorporated into the selectively opened section of the ring of the dicyclopentadiene skeleton, thereby recording information by forming a metallocene skeleton.

The third information recording medium of the invention comprises an information recording layer comprising ring-skeletons on a substrate; a metal ion is selectively incorporated between at least two ring-skeletons, thus recording information by forming a metallocene skeleton or a skeleton analogous to the metallocene skeleton.

In the above-noted composition, the skeleton analogous to the metallocene skeleton can be formed, for instance, by incorporating a chromium ion between benzene rings.

In the above-noted composition, it is preferable that the ring-skeleton is a cyclopentadiene skeleton, a heterocycle or a benzene ring.

In the above-noted composition, it is preferable that the information recording layer is directly or indirectly chemically bonded to the substrate surface via at least one atom selected from the group consisting of C, Si, Ge, Sn, Ti, Zr and S.

In the above-noted composition, it is preferable that the information recording layer is a monomolecular film, a monomolecular multilayer film or a polymer film.

A method of manufacturing an information recording medium of the invention includes the steps of:

preparing a molecule which includes at least one functional group selected from the group consisting of a functional group of Formula 1, a functional group of Formula 2, a halogenated sulfonyl group of Formula 3, a halogenated sulfinyl group of Formula 4 and a cyano group (—CN), and also includes ring-skeletons;

contacting and reacting the molecule to a substrate having an active hydrogen or an alkali metal on its surface, thus fixing the molecule to the substrate surface via a covalent bond.

Formula 1

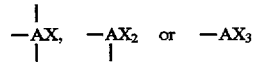

(wherein A represents C, Si, Ge, Sn, Ti or Zr; and X represents a halogen, an isocyanate group, a cyano group or an alkoxyl group)

Formula 2

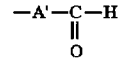

(wherein A' represents N or O)

Formula 3

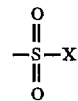

(wherein X represents a halogen)

Formula 4

(wherein X represents a halogen)

In the above-noted composition, it is preferable that the ring-skeleton is a dicyclopentadiene skeleton, a cyclopentadiene skeleton, a heterocycle or a benzene ring.

In the above-noted composition, it is preferable that the information recording layer is a monomolecular film, a monomolecular multilayer film or a polymer film.

The first method of using the information recording medium of the invention to record information in an information recording layer on a substrate, includes the step of:

selectively opening the ring of a dicyclopentadiene skeleton in the information recording layer by heat or light, thereby recording information by forming cyclopentadiene skeletons.

The second method of using the information recording medium of the invention to record information in an information recording layer on a substrate, includes the steps of:

selectively opening the ring of a dicyclopentadiene skeleton in the information recording layer by heat or light:

eliminating a cyclopentadiene proton from the skeleton, thus creating a cyclopentadienide ion; and incorporating a metal ion into the cyclopentadienide ion, thereby recording information by forming a metallocene skeleton.

The third method of using the information recording medium of the invention involves incorporating a metal ion between at least two ring-skeletons, thus recording information by forming a metallocene skeleton or a skeleton analogous to the metallocene skeleton.

In the above-noted composition, it is preferable that the ring-skeleton is a cyclopentadiene skeleton, a heterocycle and a benzene ring.

In the second and third methods of the invention, multiple storage and/or many valued memory can be carried out by repeating the recording procedure mentioned above while changing the kind of metal ion for each repetition.

In the first and second methods of the invention, it is preferable that the ring of the dicyclopentadiene skeleton is selectively opened by a scanning probe electron microscope.

In this invention, it is preferable that information is read by detecting the differences in the light absorption and refractive index values of a dicyclopentadiene skeleton from the values of a cyclopentadiene skeleton.

In this invention, it is also preferable that information is read by detecting the differences in the light absorption and refractive index values of a dicyclopentadiene skeleton, a cyclopentadiene skeleton, a heterocycle or a benzene ring from the values of a metallocene skeleton, a skeleton analogous to the metallocene skeleton or a metal atom.

In this invention, it is further preferable that the metallocene skeleton, the skeleton analogous to the metallocene skeleton or the metal atom is recognized by a scanning probe electron microscope or an electron beam.

In the above-noted methods of using an information recording medium of the invention, the information recorded in the information recording medium can be erased by removing a section comprising the metallocene skeleton or the skeleton analogous to the metallocene skeleton produced when information is recorded.

The information recording medium of the invention comprises a strong ultrathin information recording layer directly or indirectly covalently bonded to a substrate; such a medium was never realized until now. It is possible with this invention to provide an information recording layer which has a thickness at the angstrom level or can have its thickness controlled at that level.

The first method of the invention for recording information onto an information recording medium of the invention comprises:

forming an information recording layer comprising a dicyclopentadiene skeleton on a substrate;

selectively opening the ring of the dicyclopentadiene skeleton, thus forming cyclopentadiene skeletons and recording information.

The information recorded in the information recording medium by the first method can be read by detecting the differences in the light absorption or refractive index values of a dicyclopentadiene skeleton from the values of a cyclopentadiene skeleton.

The second method of the invention for recording information onto an information recording medium of the invention comprises:

forming an information recording layer comprising a dicyclopentadiene skeleton on a substrate;

selectively opening the ring of the dicylopentadiene skeleton and incorporating a metal ion into the opened section of the ring, thus recording information by forming a metallocene skeleton.

The third method of the invention for recording information onto an information recording medium of the invention comprises:

forming an information recording layer comprising a cyclopentadiene skeleton, a heterocycle or a benzene ring on a substrate;

selectively incorporating a metal ion between at least two rings of the cyclopentadiene skeleton, heterocycle or benzene ring, thereby recording information by forming a metallocene skeleton or a skeleton analogous to the metallocene skeleton.

The information recorded in the information recording medium by the second or third method can be read by detecting the differences in the light absorption or refractive index values of a cyclopentadiene skeleton, a dicyclopentadiene skeleton, a heterocycle or a benzene ring from the values of a metallocene skeleton, a skeleton analogous to the metallocene skeleton or a metal atom.

The method of the invention for erasing information includes directing the cycloaddition of cyclopentadiene skeletons (first method), cleaving a metallocene skeleton or a skeleton analogous to the metallocene skeleton (second method) and eliminating a section comprising a metallocene skeleton or a skeleton analogous to the metallocene skeleton (third method). In the second method, it is appropriate to carry out a reductive cleavage by bases, thus eliminating only a metal atom and leaving a cyclopentadiene skeleton for another recording. In the third method, however, another recording cannot be made in the same place since the section comprising the metallocene skeleton or the skeleton analogous to the metallocene skeleton is removed by the method.

A dicyclopentadiene skeleton is formed by the cycloaddition of two neighbouring cyclopentadienes through a Diels-Alder reaction. The skeleton is stable at room temperature. Either a dicyclopentadiene derivative or a cyclopentadiene derivative can be used as a starting material for the information recording layer. Then, through the above-mentioned cycloaddition process, an information recording layer comprising the dicyclopentadiene skeleton is formed.

Preferably, either heat or light is used for opening the ring of the dicyclopentadiene skeleton. As a heat or light source, it is preferable to use a semiconductor laser or the like which provides a small beam diameter and provides high energy. The semiconductor laser can also be useful for the readout of information.

By using a scanning probe electron microscope for the ring-opening of the dicyclopentadiene skeleton and the readout of information, it becomes possible to achieve the recording and readout of information at a molecular or atomic level.

As metal ions used for forming the metallocene skeleton or the skeleton analogous to the metallocene skeleton, Cr, Mn, Fe, Co, Ni, Os, Ru, V or the like are useful. However, the metal ion applicable for the invention is not limited to the ions mentioned above. In order to impart stability to the metallocene skeleton, however, it is preferable to use Fe, Ru or Os.

The second and third information recording media of the invention can achieve multiple storage and/or many valued memory by repeating recording process. However, for each repetition, the kind of metal ion incorporated into an information recording layer should be changed. In the case where the information recording layer is comprised of a dicyclopentadiene skeleton, the energy of heat or light should be of a degree capable of opening the ring of the dicyclopentadiene skeleton without breaking down the metallocene skeleton or the skeleton analogous to the metallocene skeleton. It is appropriate to make use of the differences in light absorption or refractive index for recognizing or distinguishing the kind of metallocene skeleton, skeleton analogous to the metallocene skeleton or metal ion, thereby reading information.

It is preferable to use an organic polymer film or an organic thin film, comprising a cyclopentadiene skeleton, a heterocycle, a benzene ring or a dicyclopentadiene skeleton, as the information recording layer on the substrate. However, the information recording layer of the invention is not limited to the above-noted films. In case of an organic polymer film or an organic thin film comprising a cyclopentadiene skeleton, the film may include an indenin derivative group, a fluorene derivative group or the like. Moreover, when the film comprises a heterocycle or a benzene ring, the film may comprise the heterocycle or the benzene ring as a section of a functional group. In taking into consideration the density of a cyclopentadiene skeleton, a heterocycle, a benzene ring or a dicyclopentadiene skeleton, and the thickness of an information recording layer, it is preferable to form a monomolecular film or a multilayer film with several layers as the information recording layer. Endurance, including endurance against processing, is required for an information recording layer after the formation of the layer; therefore, a chemically adsorbed monomolecular film or a chemically adsorbed multilayer film is suitable for the layer. When forming a chemically adsorbed multilayer film as an information recording layer, the kind of a metallocene skeleton or a skeleton analogous to the metallocene skeleton can be differentiated for each layer. Or alternatively, different kinds of metallocene skeletons or skeletons analogous to the metallocene skeletons can be included within a layer. It is also possible to build up a layer comprising different kinds of metallocene skeletons or skeletons analogous to the metallocene skeletons. As a result, a high density recording of multiple bits in one spot can be realized.

Information recorded by the first information recording medium of the invention can be erased by the cycloaddition of cyclopentadiene skeletons. In other words, the medium can record and erase information without physically incorporating and eliminating metal ions. Therefore, the recording and erasing of information can be repeated many times by the medium.

DETAILED DESCRIPTION OF THE INVENTION

Figure 1:
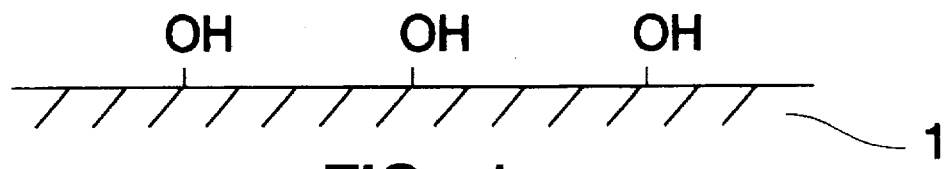
FIG. 1 shows an enlarged sectional view of a substrate of Example 1 prior to application of the recording layer.

The invention is specifically described by referring to the following examples.

Basic chemical adsorption methods include the procedure mentioned, for example, in J. Sagiv, Journal of American Chemical Society, 102:92 (1980) and in K. Ogawa et al., Langmuir, 6:851 (1990). In these methods, a chemically adsorbed film is manufactured by a dehydrochlorination reaction of molecules comprising chlorosilyl groups (chemical adsorbent) to a substrate surface comprising hydroxyl groups or the like, thus fixing the groups to the substrate surface via covalent bonds.

In forming a chemically adsorbed film, a functional group, which bonds a molecule to a substrate, is at least one functional group selected from the group consisting of a functional group of Formula 1 set forth above, a functional group of Formula 2 set forth above, a halogenated sulfonyl group of Formula 3 set forth above, a halogenated sulfinyl group of Formula 4 set forth above and a cyano group (—CN). However, the functional group applicable to the invention is not limited to the above-noted groups. As a halogen of the invention, Cl, Br or I can be included. In terms of reactivity, however, it is preferable to use Cl.

The substrates useful in this invention have on the surface at least one functional group selected from the group consisting of a hydroxyl group, a carboxyl group, a sulfonic acid group, a sulfinic acid group, a phosphoric acid group, a phosphorous acid group, a quaternary Ammonium group, a quaternary phosphonium group, a thiol group and an amino group; and/or at least one functional group, in which an alkali metal or alkaline earth metal is substituted for H of the group, selected from the group consisting of a hydroxyl group, a carboxyl group, a sulfonic acid group, a sulfinic acid group, a phosphoric acid group, a phosphorous acid group, a quaternary ammonium group, a quaternary phosphonium group, a thiol group and an amino group. The chemically adsorbed film of the invention is not limited to films which include the above-mentioned functional groups, and is fixed to the substrate surface comprising the functional group.

When the substrate surface has none or only a few of the functional groups mentioned above, a UV irradiation or oxidizing agent treatment should be applied to the surface, thus effectively creating or increasing the functional groups on the surface.

The method of fixing the chemically adsorbed film to the substrate surface includes but is not limited to methods of contacting a substrate to a liquid and/or gaseous chemical adsorbent, and/or to a solution dissolving the chemical adsorbent.

In the case of using the above-mentioned solution dissolving the chemical adsorbent, it is preferable to use a solvent comprised of molecules with no active hydrogens. For instance, if the chemical adsorbent comprises long-chain alkyl groups, a mixed solvent of hydrocarbon and halogenated hydrocarbon can be employed. In addition, it is appropriate to use halogenated hydrocarbon solvent, aromatic solvent or the like for the chemical adsorbent comprising carbonyl groups. However, the solvent applicable in the invention is not limited to the solvents mentioned above.

After fixing the chemically adsorbed film to the substrate, it is preferable to remove unreacted molecules: as a result, a monomolecular film and a multilayer film can be easily formed on the substrate. It is preferable to use an aprotic solvent to remove the unreacted molecules; for instance, halogenated carbon, ether, lactone, ester, nitrile, amide or the like are included as such solvents. However, the solvent is not limited to those solvents.

The invention will now be explained specifically in the following examples.

EXAMPLE 1

An adsorption solution A was prepared by dissolving about 1% by weight of (3-dicyclopentadienylpropyl) trichlorosilane into a mixed solvent of hexadecane, carbon tetrachloride and chloroform at a weight ratio of 80:12:8, respectively.

A glass substrate 1 (hydrophilic substrate) as shown in FIG. 1 was prepared. After being washed with an organic solvent, glass substrate 1 was dipped and held in adsorption solution A for three hours. Due to this treatment, bonds of the following Formula 5 were formed on glass substrate 1.

Formula 5

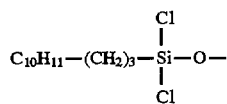

(wherein $C_{10}H_{11}$ represents a dicyclopentadienyl group)

Figure 2:
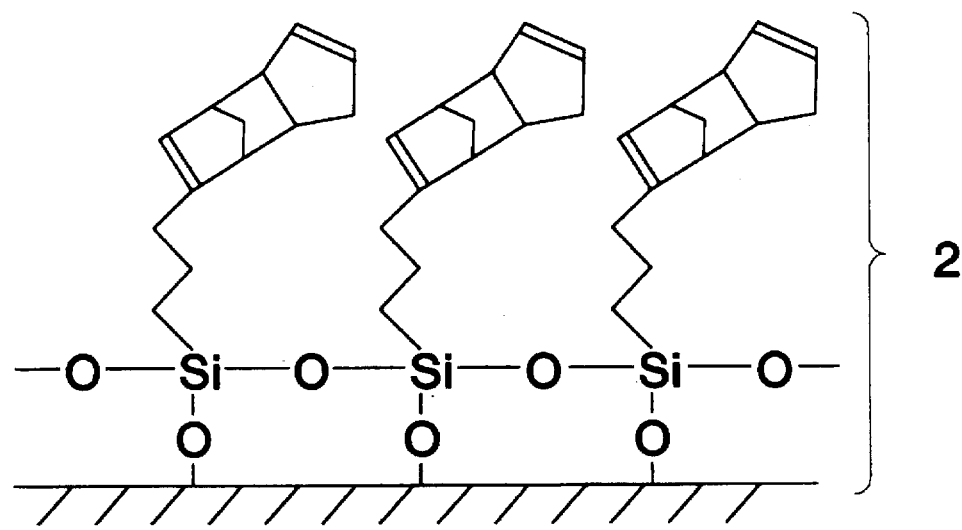
FIG. 2 shows an enlarged sectional view of a chemically adsorbed monomolecular film of Example 1.

After washing glass substrate 1 with chloroform (nonaqueous solvent) for 15 minutes and with water for another 15 minutes, a chemically adsorbed monomolecular film 2 of FIG. 2 was formed on the substrate surface. Chemically adsorbed monomolecular film 2 was firmly bonded to glass substrate 1, and had excellent water-repelling properties.

The formation of the film was confirmed by obtaining particular signals for this structure at 2925, 2855 (attribute of —$CH_2$—), 1650 (attribute of C=C), 1465 (attribute of —$CH_2$—), and 1080 (attribute of Si-O)$cm^{-1}$ by Fourier transform infrared absorption spectral (FTIR) measurement.

Then, glass substrate 1 formed with chemically adsorbed monomolecular film 2 was dipped and held in decalin. After heating a section of the film with an infrared laser at around 190° C. for one hour, NaH and then anhydrous $FeCl_2$ were added to the decalin.

Figure 3:
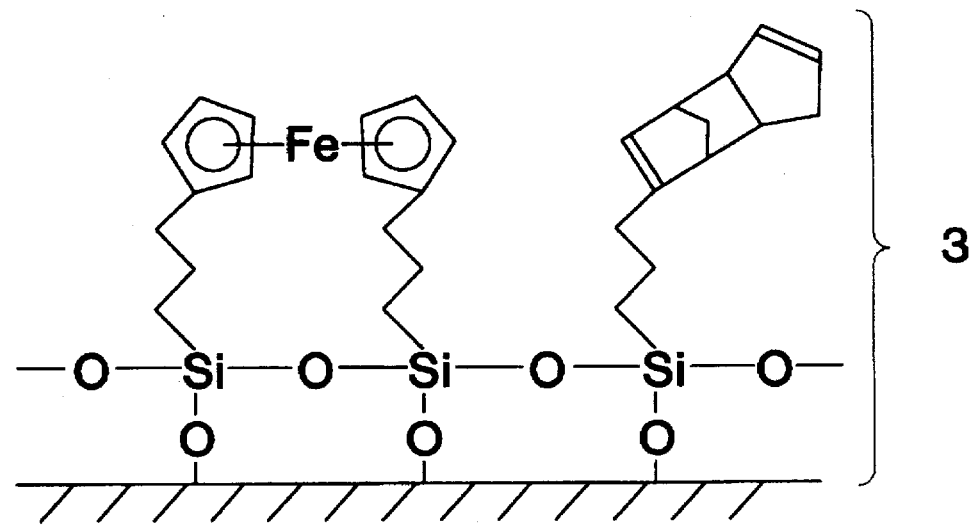
FIG. 3 shows an enlarged sectional view of another chemically adsorbed monomolecular film of Example 1.

After the above-noted procedure, glass substrate 1 was washed with hexane for 10 minutes and then with water for another 10 minutes; as a result, the skeleton, which had been irradiated with the infrared laser, was changed to a ferrocene skeleton, thus forming a chemically adsorbed monomolecular film 3 (FIG. 3). Chemically adsorbed monomolecular film 3 was firmly connected to the substrate and had excellent water-repelling properties.

The creation of an additional particular signal at 815 (attribute of a ferrocene skeleton) $cm^{-1}$ and also the disappearance of the signal at 1650 $cm^{-1}$ were confirmed by FTIR measurement. Chemically adsorbed monomolecular 3 was proved to have Fe atoms by X-ray photoelectric spectroscopic (XPS) measurement. The above-noted results indicate that a signal can be recorded as a ferrocene in the section irradiated with the laser.

EXAMPLE 2

Glass substrate 1 formed with chemically adsorbed monomolecular film 3 of Example 1 was dipped and held in decalin. After heating only the dicyclopentadiene skeleton, which had not been changed to the ferrocene skeleton, with an infrared laser at about 190° C. for one hour, NaH and then anhydrous $RuCl_2$ were added to the decalin.

Figure 4:
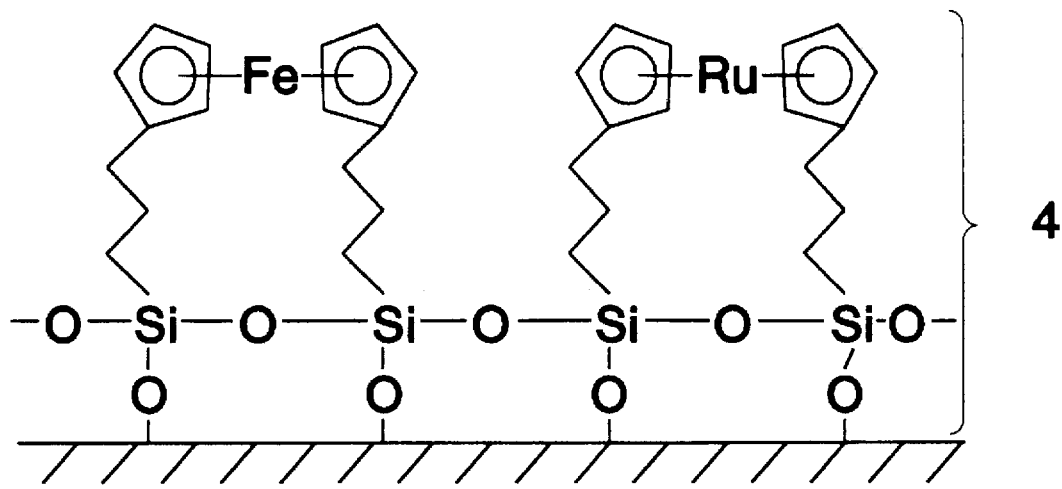
FIG. 4 shows an enlarged sectional view of a chemically adsorbed monomolecular film of Example 2.
Figure 5:
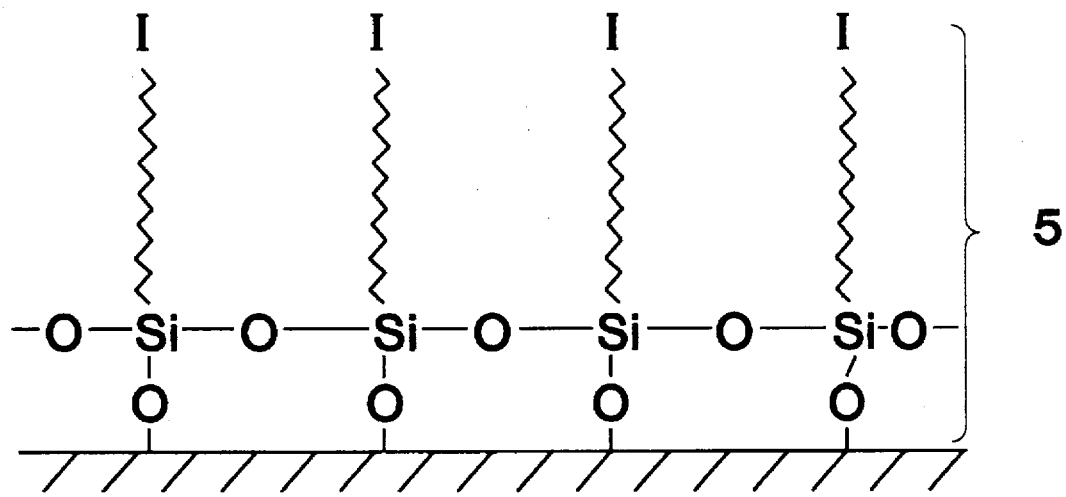
FIG. 5 shows an enlarged sectional view of a chemically adsorbed monomolecular film of Example 4.

After that, glass substrate 1 was washed with hexane for 10 minutes and then with water for another 10 minutes, thereby forming a chemically adsorbed monomolecular film 4, in which a ferrocene skeleton and a ruthenocene skeleton are intermingled, as shown in FIG. 4. The monomolecular film was firmly connected to the substrate, and possessed good water-repelling properties.

The creation of an additional signal at 821 $cm^{-1}$ was confirmed by FTIR measurement. In addition to the Fe atom, a Ru atom was also found in chemically adsorbed monomolecular film 4 by XPS measurement. The results indicate that the information recorded with light of 821 $cm^{-1}$ and 815 $cm^{-1}$ can be recognized and read.

EXAMPLE 3

The surface of chemically adsorbed monomolecular film 4 including ferrocene and ruthenocene was observed in ethanol with an interatomic force microscope (AFM), a type of scanning probe electron microscope. In observing the sections of the film which had been irradiated with the infrared laser in Examples 1 and 2, convex and concave surfaces with three different heights were clearly found. In other words, there were two kinds of metallocene skeletons which had been formed as a result of the above-described reactions, and an unreacted dicyclopentadiene skeleton in chemically adsorbed monomolecular film 4.

EXAMPLE 4

An adsorption solution B was prepared by dissolving about 1% by weight of 14-iodotetradecyltrichlorosilane into a mixed solvent of hexadecane, carbon tetrachloride and chloroform at a weight ratio of 80:12:8, respectively.

As shown in FIG. 1, a glass substrate 1 was used as a hydrophilic substrate. After washing glass substrate 1 with an organic solvent, the substrate was dipped and held in adsorption solution B for three hours. Due to this treatment, bonds of the following Formula 6 were formed on glass substrate 1.

Formula 6

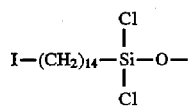

Glass substrate 1 was washed with chloroform (nonaqueous solvent) for 15 minutes and then with water for another 15 minutes, thus forming a chemically adsorbed monomolecular film 5. The monomolecular film was firmly connected to the substrate, and possessed good water-repelling properties.

Signals were obtained for this structure at 2925, 2855 (attribute of —$CH_2$—), 1465 (attribute of —$CH_2$—), and 1080 (attribute of Si-O) $cm^{-1}$ by FTIR measurement, thereby confirming the formation of the film.

Figure 6:
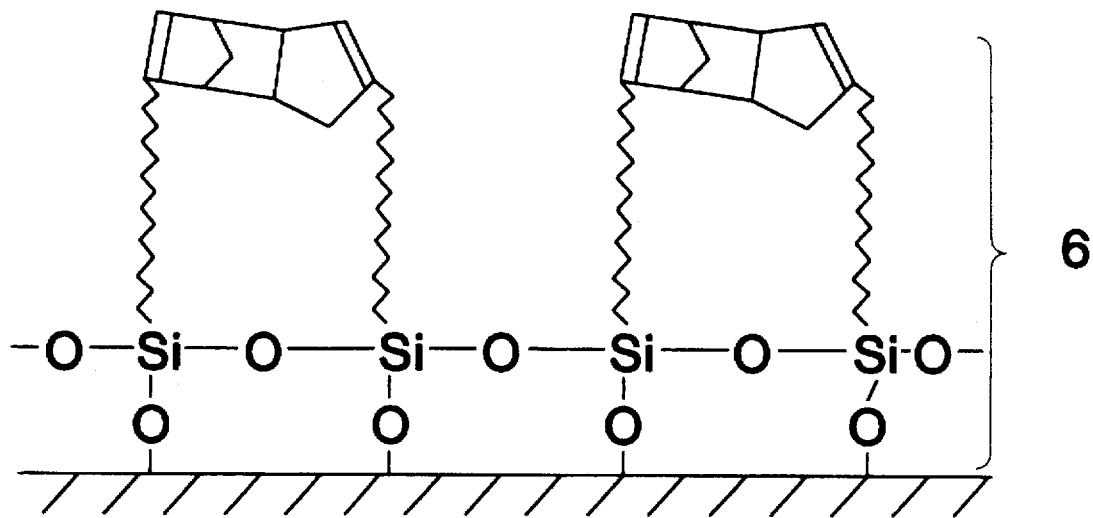
FIG. 6 shows an enlarged sectional view of another chemically adsorbed monomolecular film of Example 4.

Glass substrate 1 formed with chemically adsorbed monomolecular film 5 was dipped and held in dry tetrahydrofuran (THF) under a nitrogen atmosphere. Hexapentadienide sodium was then added and reacted for 30 minutes, thus forming cyclopentadiene skeletons. Dicyclopentadiene skeletons were soon formed by the cycloaddition of two neighboring cyclopentadiene skeletons, thus forming a chemically adsorbed monomolecular film 6 as shown in FIG. 6.

An additional signal was obtained for this structure at 1650 (attribute of C=C) $cm^{-1}$ by FTIR measurement, thereby confirming the formation of the film. In other words, the information recorded with light of 1650 $cm^{-1}$ can be read.

Glass substrate 1 having chemically adsorbed monomolecular film 6 on its surface was dipped and held in decalin. After heating only one section of the film with an infrared laser at about 190° C. for one hour, NaH and then anhydrous $FeCl_2$ were added to the decalin.

Figure 7:
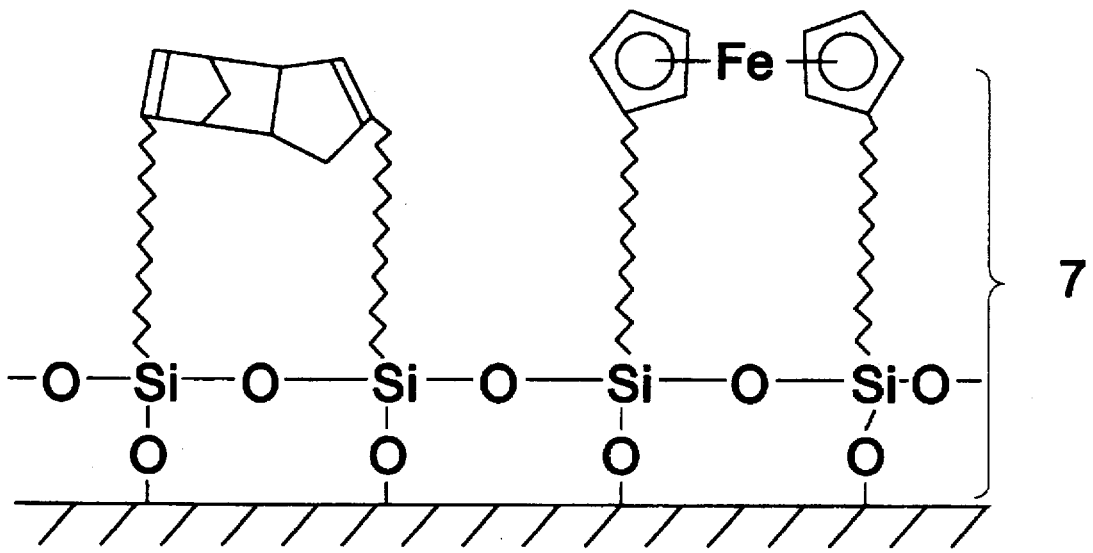
FIG. 7 shows an enlarged sectional view of a further chemically adsorbed monomolecular film of Example 4.

After that, glass substrate 1 was washed with hexane for 10 minutes and then with water for another 10 minutes. As a result, the chemically adsorbed monomolecular film 7 of FIG. 7, in which only the section irradiated with the infrared laser was changed to a ferrocene skeleton, was formed. The monomolecular film was firmly connected to the substrate, and possessed good water-repelling properties.

A particular signal was obtained for this structure at 815 (attribute of a ferrocene skeleton) $cm^{-1}$ by FTIR measurement. According to XPS measurement, it was proved that chemically adsorbed monomolecular film 7 comprised Fe atoms. These results indicate the information recorded with light of 815 $cm^{-1}$ can be read.

EXAMPLE 5

An adsorption solution C was prepared by dissolving about 1% by weight of 6-dicyclopentadienyl-1,8-di (trichlorosilyl)octane into a mixed solvent of hexadecane, carbon tetrachloride and chloroform at a weight ratio of 80:12:8, respectively.

As shown in FIG. 1, a glass substrate 1 was used as a hydrophilic substrate. After being washed with organic solvent, glass substrate 1 was dipped and held in adsorption solution C for three hours. As a result, bonds of the following Formula 7 were formed on glass substrate 1.

Formula 7

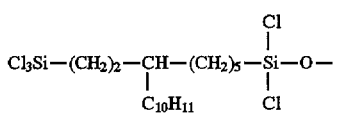

(wherein $C_{10}H_{11}$ represents a dicyclopentadienyl skeleton)

Figure 8:
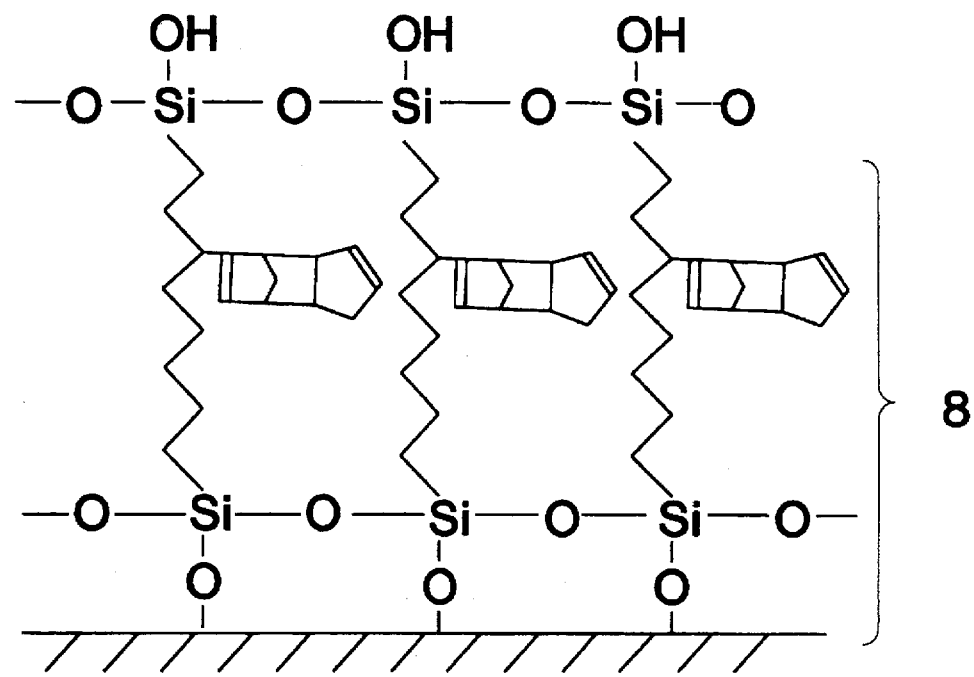
FIG. 8 shows an enlarged sectional view of a chemically adsorbed monomolecular film of Example 5.

Glass substrate 1 was washed with chloroform for 15 minutes and then with water for another 15 minutes, thus forming a chemically adsorbed monomolecular film 8 as shown in FIG. 8. The monomolecular film was firmly connected to the substrate, and possessed good water-repelling properties.

Distinctive signals were obtained for this structure at 2925, 2855 (attribute of —$CH_2$—), 1650 (attribute of C=C), 1465 (attribute of —$CH_2$—), 1080 (attribute of Si-O) cm by FTIR measurement, thus confirming formation of the film.

Glass substrate 1 formed with chemically adsorbed monomolecular film 8 was dipped and held in decalin, and only a section of the film was heated with an infrared laser at about 190° C. for one hour. NaH and then $FeCl_2$ were added to the decalin.

Figure 9:
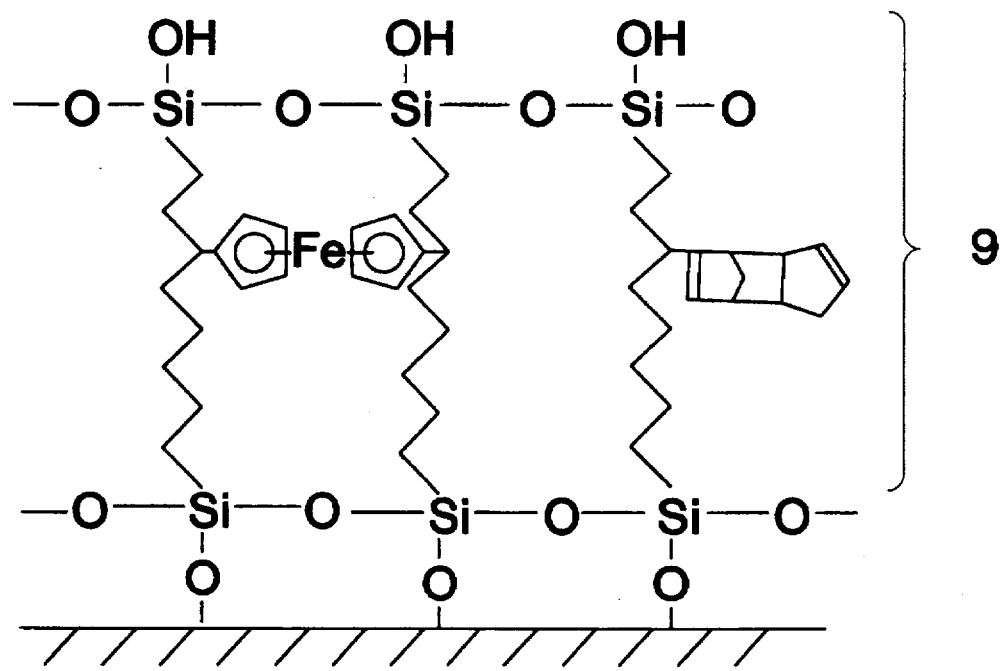
FIG. 9 shows an enlarged sectional view of another chemically adsorbed monomolecular film of Example 5.

Glass substrate 1, moreover, was washed with hexane for 10 minutes and then with water for another 10 minutes. As shown in FIG. 9, a chemically adsorbed monomolecular film 9 comprising a ferrocene skeleton was formed. The monomolecular film was firmly connected to the substrate, and possessed good water-repelling properties.

An additional distinctive signal for this structure at 815 (attribute of a ferrocene skeleton) $cm^{-1}$ was confirmed by FTIR measurement while the signal at 1650 $cm^{-1}$ disappeared. According to XPS measurement, it was confirmed that the film comprised Fe atoms, thus indicating the formation of a ferrocene skeleton.

Figure 10:
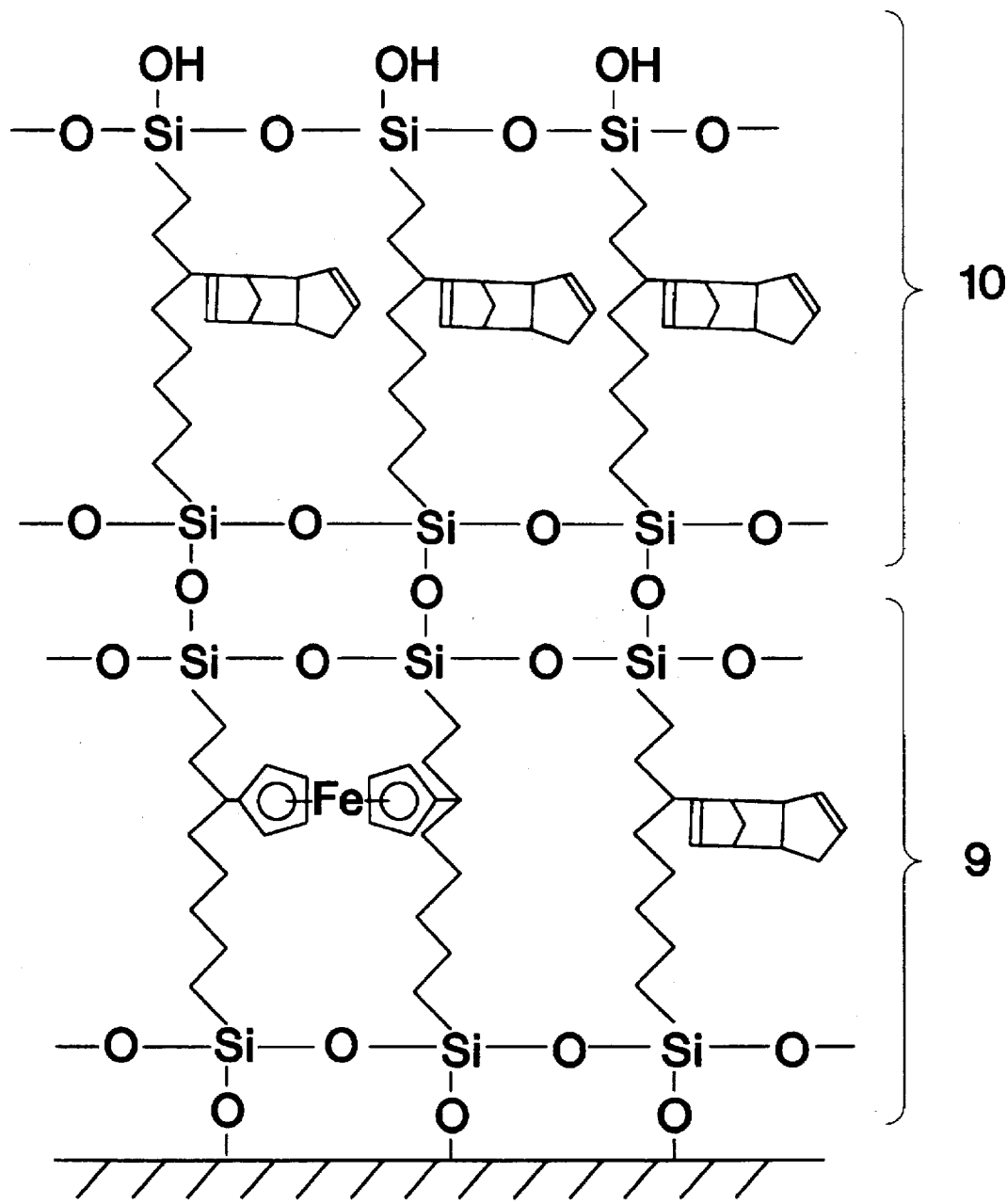
FIG. 10 shows an enlarged sectional view of a further chemically adsorbed multilayer film of Example 5.

Glass substrate 1 having chemically adsorbed monomolecular film 9 on its surface was then dipped and held in adsorption solution C for three hours. After washing glass substrate 1, a chemically adsorbed monomolecular film 10 was formed, thus forming a chemically adsorbed multilayer film of FIG. 10 on the substrate. The monomolecular film was firmly connected to the substrate, and possessed good water-repelling properties.

The signals obtained by FTIR measurement at 2925, 2855 (attribute of —$CH_2$—), 1465 (attribute of —$CH_2$—), 1080 (attribute of Si-O) $cm^{-1}$ were doubled, thus confirming the formation of the multilayer film.

Glass substrate 1, which had the chemically adsorbed multilayer film comprised of chemically adsorbed monomolecular films 9 and 10 on its surface, was dipped and held in decalin. Then, a section of chemically adsorbed monomolecular film 10 was heated with an infrared laser at about 190° C. for one hour. NaH and then $RuCl_2$ were added to the decalin.

Figure 11:
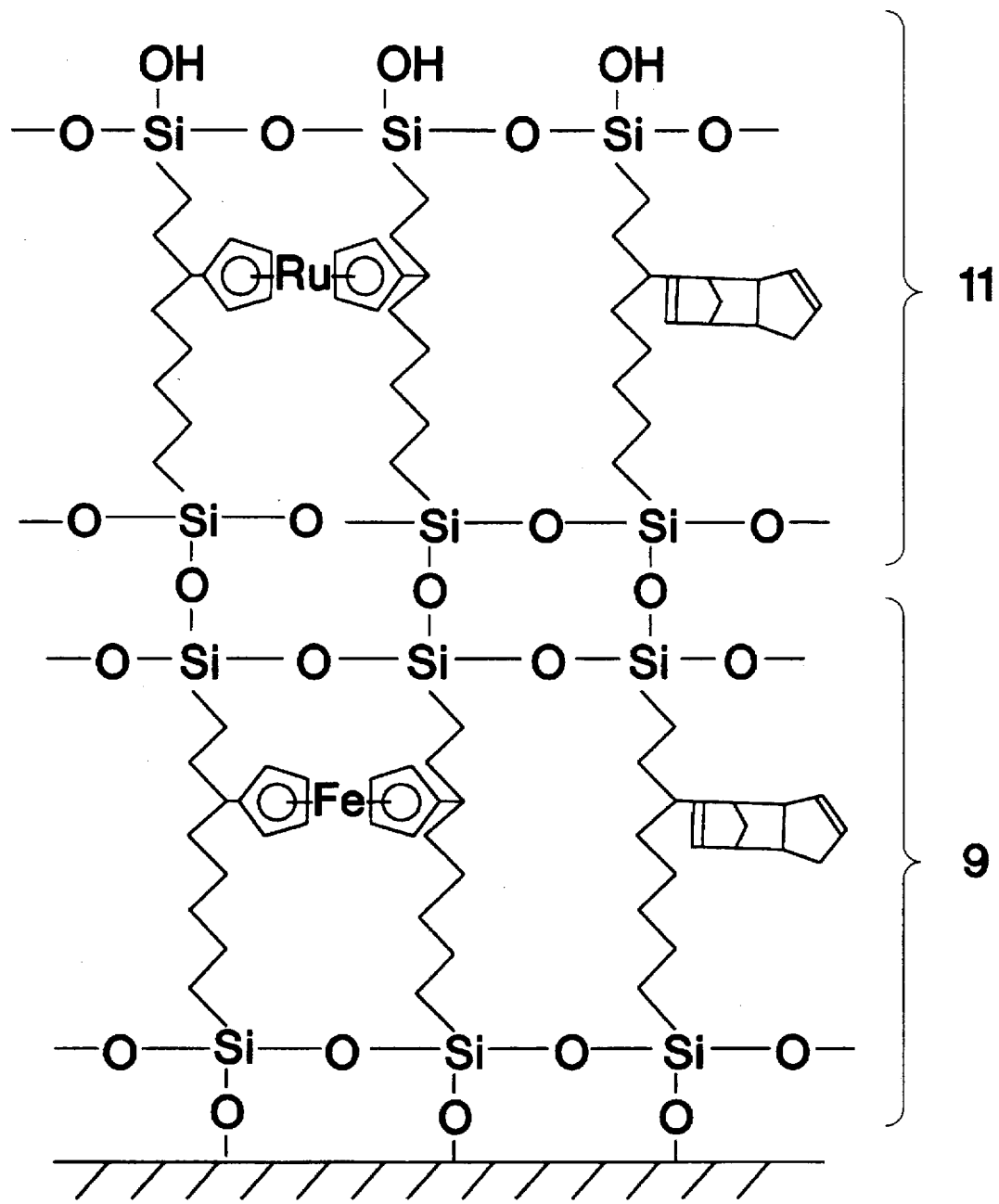
FIG. 11 shows an enlarged sectional view of yet another chemically adsorbed multilayer film of Example 5.

After washing glass substrate 1 with hexane for 10 minutes and then with water for another 10 minutes, a chemically adsorbed monomolecular film 11 comprising ruthenocene skeletons was formed as shown in FIG. 11. The monomolecular film was firmly connected to the substrate, and possessed good water-repelling properties.

An additional distinctive signal was found at 821 (attribute of a ruthenocene skeleton) $cm^{-1}$ by FTIR measurement while the signal at 1650 $cm^{-1}$ disappeared. It was confirmed by XPS measurement that chemically adsorbed monomolecular film 11 comprised Ru atoms, thus indicating the formation of ruthenocene skeletons. According to the above-noted results, the information recorded with light of 821 cm$^{-1}$ and 815 cm$^{-1}$ can be read.

EXAMPLE 6

Figure 12:
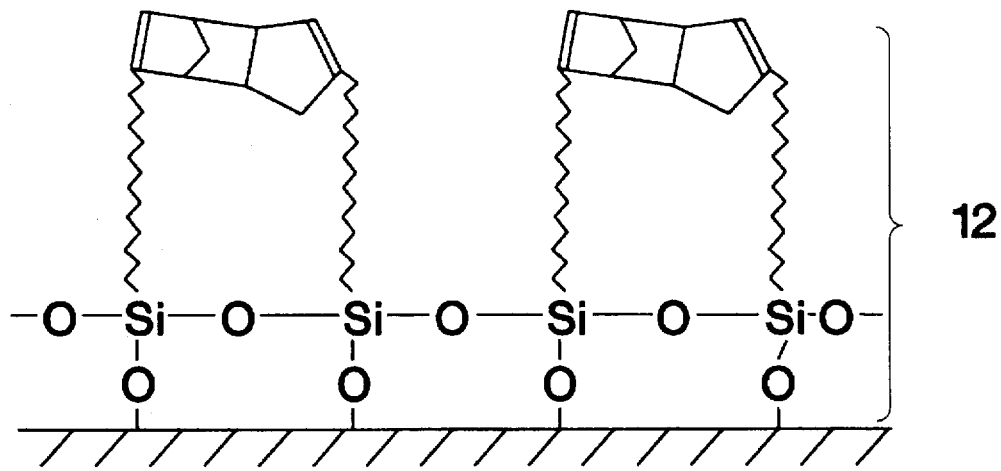
FIG. 12 shows an enlarged sectional view of a chemically adsorbed monomolecular film of Example 6.

Glass substrate 1 having chemically adsorbed monomolecular film 7 of Example 4 on its surface was dipped and held in frozen methylene chloride. Ethylamine was then added to the solution. After three minutes, lithium powder was also added to the methylene chloride, and then glass substrate 1 was left for an extra 10, minutes. After being quenched with methanol, glass substrate 1 was washed with chloroform for 10 minutes and then with water for another 10 minutes. As a result, a chemically adsorbed monomolecular film 12 was formed as shown in FIG. 12. The monomolecular film was firmly connected to the substrate, and possessed good water-repelling properties.

FTIR measurement showed that the signal at 815 cm$^{-1}$ dissapeared. XPS measurement, in addition, showed that chemically adsorbed monomolecular film 12 did not comprise Fe atoms, thereby confirming the disappearance of ferrocene skeletons in the film. In other words, both readout and erasure of recorded information can be achieved with light of 815 cm$^{-1}$ in the invention.

EXAMPLE 7

An adsorption solution D was prepared by dissolving about 1% by weight of (3-cyclopentadienyl propyl) trichlorosilane into a mixed solvent of hexadecane, carbon tetrachloride and chloroform at a weight ratio of 80:12:8, respectively, As shown in FIG. 1, a glass substrate 1 was used as a hydrophilic substrate. After being washed with organic solvent, glass substrate 1 was dipped and held in adsorption solution D for three hours. As a result, bonds of the following formula 8 were formed on glass substrate, Formula 8

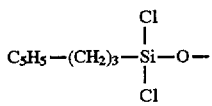

(wherein C$_5$H$_5$ represents a cyclopentadienyl group)

Figure 13:
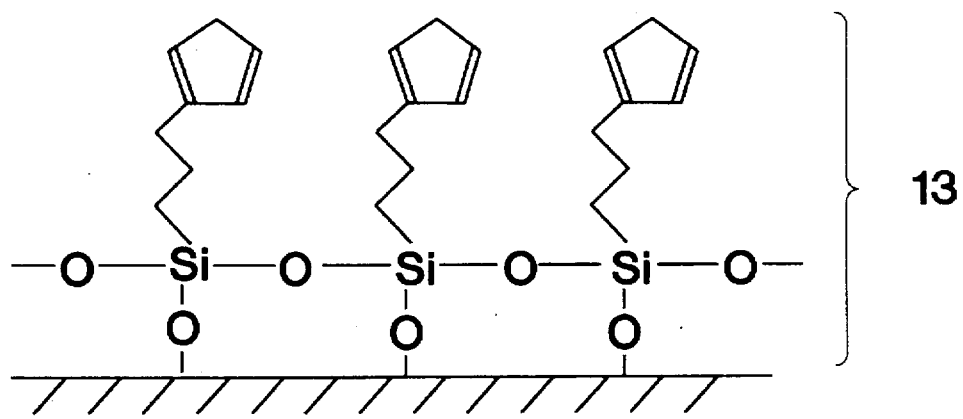
FIG. 13 shows an enlarged sectional view of a chemically adsorbed monomolecular film of Example 7.

Glass substrate 1 was first washed: with chloroform for 15 minutes and then with water for another 15 minutes, thus forming a chemically adsorbed monomolecular film 13 as shown in FIG. 13. The monomolecular film was firmly connected to the substrate, and possessed good water-repelling properties.

Distinctive signals were obtained for this structure at 2925, 2855 (attribute of —CH$_2$—), 1850 (attribute of C=C), 1485 (attribute of —CH$_2$—) and 1080 (attribute of Si-O) cm$^{-1}$ by FTIR measurement, thereby confirming the formation of the film.

Glass substrate 1 having chemically adsorbed monomolecular film 13 on its surface was dipped and held in decalin. NaH and then anhydrous FeCl$_2$ were added to the decalin.

Figure 14:
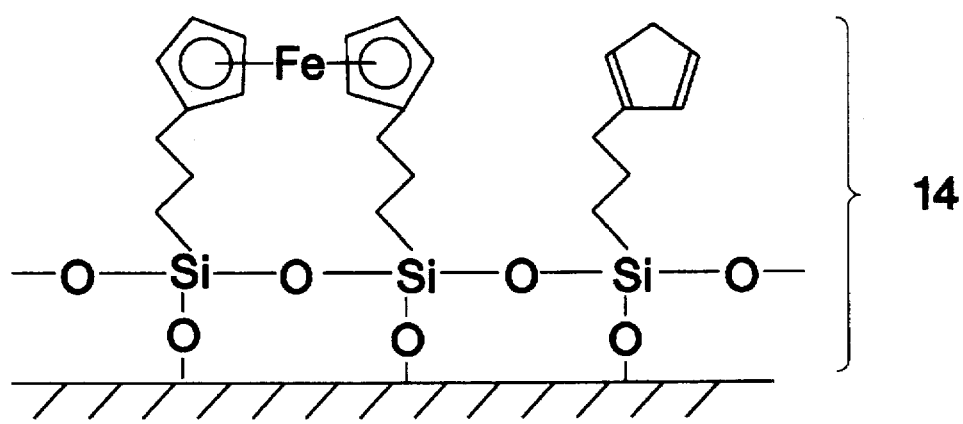
FIG. 14 shows an enlarged sectional view of another chemically adsorbed monomolecular film of Example 7.

Thereafter, glass substrate 1 was washed with hexane for 10 minutes and then with water for another 10 minutes, thus forming a chemically adsorbed monomolecular film 14 comprising a ferrocene skeleton as shown in FIG. 14. The monomolecular film was firmly connected to the substrate, and possessed good water-repelling properties.

FTIR measurement showed the disappearance of the signal at 1650 cm$^{-1}$ and the creation of an additional distinctive signal at 815 (attribute of a ferrocene skeleton) cm$^{-1}$ XPS measurement indicated that chemically adsorbed monomolecular film 14 comprised Fe atoms. The results show that the information recorded with light of 815 cm$^{-1}$ can be read.

EXAMPLE 8

An adsorption solution E was prepared by dissolving about 1% by weight of (8-dicyclopentadienyloctyl) trichlorosilane into a mixed solvent of hexadecane, carbon tetrachloride and chloroform at a weight ratio of 80:12:8, respectively.

Figure 15:
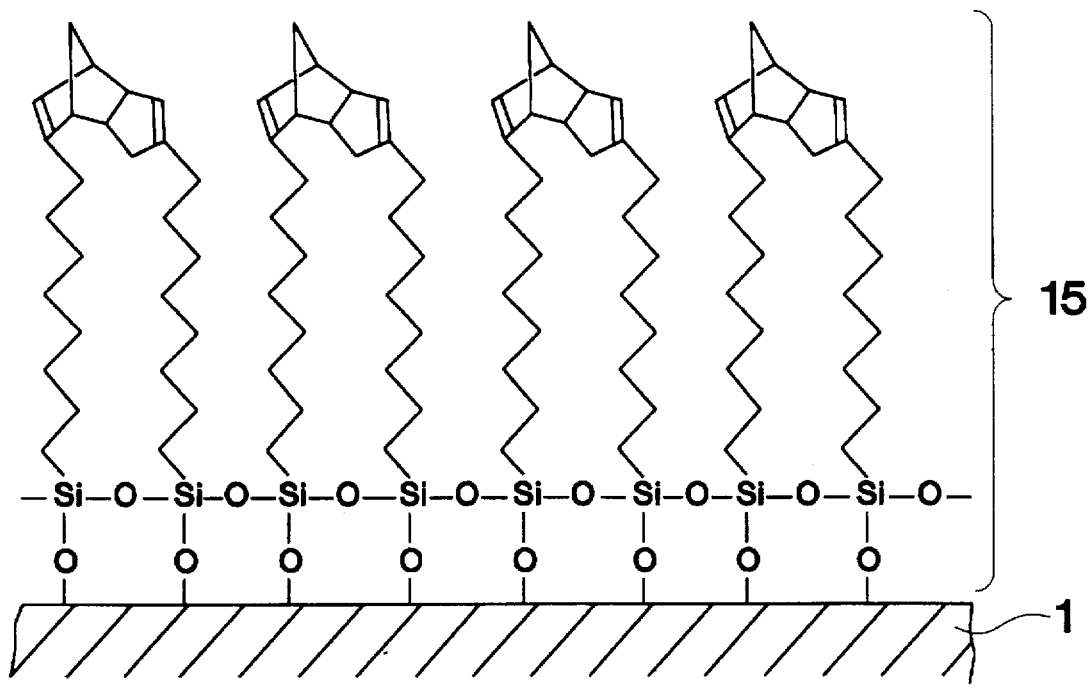
FIG. 15 shows an enlarged sectional view of a chemically adsorbed monomolecular film of Example 8.

A glass substrate 1 (hydrophilic substrate) as shown in FIG. 1 was prepared. After being washed with an organic solvent, glass substrate 1 was dipped and held in adsorption solution E for three hours. After being washed with chloroform (nonaqeous solvent) for 15 minutes and then with water for another 15 minutes, glass substrate 1 was annealed at 100° C. in a nitrogen atmosphere for 20 minutes. As a result, a chemically adsorbed monomolecular film 15 of FIG. 15 was formed on the substrate surface. Chemically adsorbed monomolecular film 15 was firmly bonded to glass substrate 1, and had excellent water-repelling properties. The formation of the film was confirmed by obtaining particular signals for this structure at 2925, 2855 (attribute of —CH$_2$—), 1650 (attribute of C=C), 1465 (attribute of —CH$_2$—), and 1080 (attribute of Si-O) cm$^{-1}$ by FTIR measurement.

Figure 16:
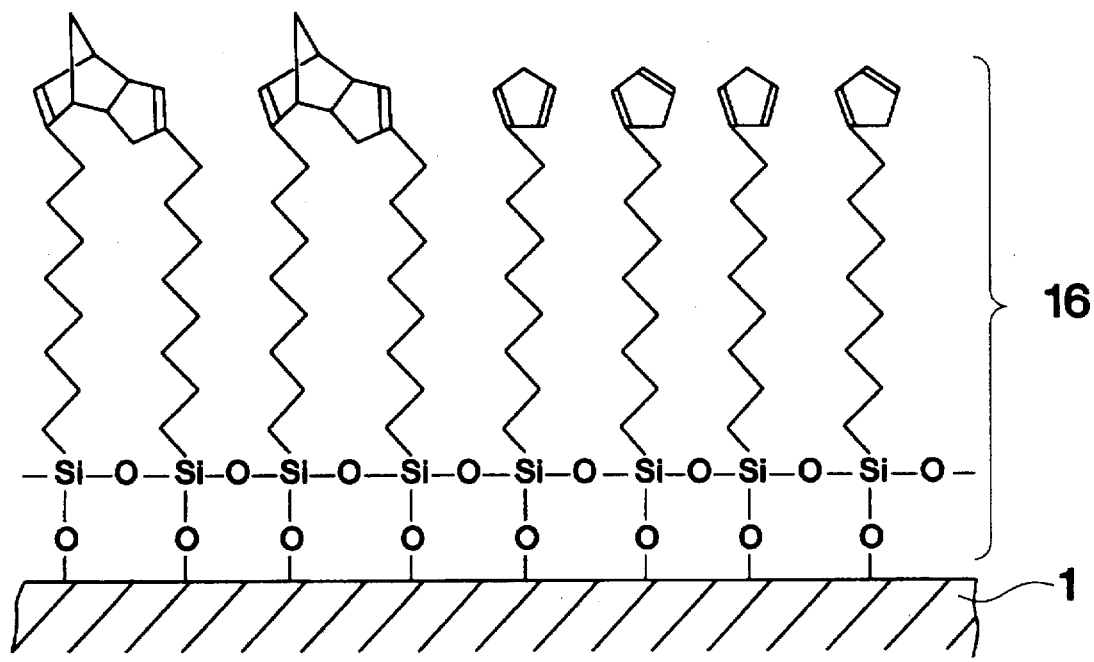
FIG. 16 shows an enlarged sectional view of another chemically adsorbed monomolecular film of Example 8 after being irradiated with a laser.

The half of glass substrate 1 formed with chemically adsorbed monomolecular film 15 was then irradiated with an infrared laser at about 190° C. for five minutes. Signals attributed to the vibration of the aromatic skeleton were found at 1660 and 1610 cm$^{-1}$ by FTIR measurement, and the measurement also showed that the signal at 1650 cm$^{-1}$ decreased to 45% of the signal obtained immediately after the formation of chemically adsorbed monomolecular film 15. These results indicate that the rings of dicyclopentadiene skeletons were opened by the irradiation, and that cyclopentadiene skeletons were formed. In other words, a chemically adsorbed monomolecular film 16 of FIG. 16 was formed on the surface of glass substrate 1. The signals from glass substrate 1 were observed by FTIR measurement after 5, 10, 30 and 60 days, but there was no sign of a change in the signals.

Following that, glass substrate 1 was again irradiated with an infrared laser at 70° C. for two minutes. According to FTIR measurement, the signals at 1660 and 1610 cm$^{-1}$ disappeared, and the intensity of the signal at 1650 cm$^{-1}$ returned to the same intensity of the initial signal obtained immediately after the formation of chemically adsorbed monomolecular film 15, thereby confirming the formation of dicyclopentadiene skeletons.

Even when functional groups other than the ones used in Examples 1–8 were applied, similar information recording layers were formed.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A method of recording information on an information recording medium, which is comprised of an information recording layer comprising a dicyclopentadiene skeleton on a substrate surface, comprising:

selectively opening the ring of said dicyclopentadiene skeleton in said information recording layer by heat or light, thus recording information by forming cyclopentadiene skeletons.

2. A method of recording information on an information recording medium, which is comprised of an information recording layer comprising a dicyclopentadiene skeleton on a substrate surface, comprising:

selectively opening the ring of said dicyclopentadiene skeleton in said information recording layer by heat or light;

eliminating a cyclopentadiene proton from said dicyclopentadiene skeleton, thus creating a cyclopentadienide ion; and incorporating a metal ion into said cyclopentadienide ion, thereby recording information by forming a metallocene skeleton.

3. A method according to claim 2, wherein multiple storage or many valued memory is carried out by repeating the recording of information while changing the kind of said metal ion for each repetition.

4. A method of recording information on an information recording medium, which is comprised of an information recording layer comprising a cyclopentadiene skeleton, a heterocycle or a benzene ring on a substrate surface, comprising:

incorporating a metal ion between at least two rings of the cyclopentadiene skeleton, heterocycle or benzene ring, thus recording information by forming a metallocene skeleton or a skeleton analogous to said metallocene skeleton.

5. A method according to claim 4, wherein multiple storage or many valued memory is carried out by repeating the recording of information while changing the kind of said metal ion for each repetition.

6. A method for reading information recorded on an information recording medium, said information being recorded by the formation of cyclopentadiene skeletons in the information recording medium, said method comprising detecting in the medium differences in light absorption or refractive index between the light absorption or refractive index of a dicyclopentadiene skeleton and the light absorption or refractive index of said cyclopentadiene skeleton.

7. A method according to claim 6, wherein said dicyclopentadiene skeleton or said cyclopentadiene skeleton is recognized by a scanning probe electron microscope or an electron beam.

8. A method for reading information recorded on an information recording medium, said information being recorded by the formation of a metallocene skeleton or a skeleton analogous to said metallocene skeleton in the information recording medium, said method comprising detecting in the medium differences in light absorption or refractive index between the light absorption or refractive index of a ring-skeleton in said medium selected from the group consisting of a dicyclopentadiene skeleton, a cyclopentadiene skeleton, a heterocycle and a benzene ring, and the light absorption or refractive index of said metallocene skeleton, said skeleton analogous to said metallocene skeleton or a metal ion.

9. A method according to claim 8, wherein said metallocene skeleton, said skeleton analogous to said metallocene skeleton or said metal atom is recognized by a scanning probe electron microscope or an electron beam.

10. A method of erasing information recorded on an information recording medium, wherein information recorded in said information recording medium by the selective formation of cyclopentadiene skeletons is erased by the cycloaddition of said cyclopentadiene skeletons.

11. A method of erasing information recorded on an information recording medium, wherein information recorded in said information recording medium by the selective formation of a metallocene skeleton or a skeleton analogous to said metallocene skeleton is erased by cleaving said metallocene skeleton or said skeleton analogous to said metallocene skeleton.

12. A method of erasing information recorded on an information recording medium, wherein information recorded in said information recording medium by the selective formation of a metallocene skeleton or a skeleton analogous to a metallocene skeleton is erased by removing a section of the medium including said metallocene skeleton or said skeleton analogous to said metallocene skeleton.

13. A method of recording information on an information recording medium, which comprises an information recording layer comprising a dicyclopentadiene skeleton on a substrate surface, comprising:

selectively opening the ring of said dicyclopentadiene skeleton by a scanning probe electron microscope, thus recording information by forming cyclopentadiene skeletons.

14. A method of recording information on an information recording medium, comprising an information recording layer comprising a dicyclopentadiene skeleton on a substrate surface, comprising:

selectively opening the ring of said dicyclopentadiene skeleton in said information recording layer by a scanning probe electron microscope;

eliminating a cyclopentadiene proton from said dicyclopentadiene skeleton, thus creating a cyclopentadienide ion; and incorporating a metal ion into said cyclopentadienide ion, thereby recording information by forming a metallocene skeleton.

* * * * *